(12) United States Patent
Weil et al.

(10) Patent No.: US 12,542,585 B2
(45) Date of Patent: Feb. 3, 2026

(54) MANAGING MASSIVE MIMO ANTENNAS IN A WIRELESS NETWORK

(71) Applicant: QGT International, Inc., San Diego, CA (US)

(72) Inventors: Dan Weil, Tel Aviv (IL); Yaniv Vaknin, Tel Aviv (IL); Daniel Yellin, Raanana (IL)

(73) Assignee: QUALCOMM Incorporated, San Diego, CA (US)

( * ) Notice: Subject to any disclaimer, the term of this patent is extended or adjusted under 35 U.S.C. 154(b) by 557 days.

(21) Appl. No.: 18/055,689

(22) Filed: Nov. 15, 2022

(65) Prior Publication Data

US 2023/0155648 A1 May 18, 2023

Related U.S. Application Data

(60) Provisional application No. 63/264,113, filed on Nov. 16, 2021.

(51) Int. Cl.
| | |
|---|---|
| *H04B 7/06* | (2006.01) |
| *H04B 7/0413* | (2017.01) |
| *H04B 7/0426* | (2017.01) |
| *H04B 17/12* | (2015.01) |
| *H04W 24/02* | (2009.01) |

(52) U.S. Cl.
CPC ......... *H04B 7/0608* (2013.01); *H04B 7/0413* (2013.01); *H04B 7/0426* (2013.01); *H04B 17/12* (2015.01); *H04W 24/02* (2013.01)

(58) Field of Classification Search
CPC .... H04B 7/0608; H04B 7/0426; H04B 17/12; H04B 7/0413; H04W 24/02
See application file for complete search history.

(56) References Cited

U.S. PATENT DOCUMENTS

| | | | |
|---|---|---|---|
| 2019/0014488 A1* | 1/2019 | Tan | G06N 3/044 |
| 2021/0385666 A1* | 12/2021 | Ramiro Moreno | H04W 16/18 |
| 2022/0158703 A1* | 5/2022 | Jiang | H04B 7/0695 |
| 2023/0063522 A1* | 3/2023 | Vaknin | H04W 16/18 |
| 2024/0155383 A1* | 5/2024 | Massaro | H04W 24/02 |
| 2024/0172016 A1* | 5/2024 | Vikram | H04W 24/08 |

(Continued)

FOREIGN PATENT DOCUMENTS

WO 2020181533 A1 9/2020

OTHER PUBLICATIONS

Lin et al., "A Deep Learning Approach for MIMO-NOMA Downlink Signal Detection", Jun. 2, 2019, Sensors (Year: 2019).*

(Continued)

*Primary Examiner* — Michael K Phillips
(74) *Attorney, Agent, or Firm* — Harrity & Harrity LLP

(57) ABSTRACT

Various aspects of the present disclosure generally relate to wireless communication. In some aspects, a network entity may calculate, using a machine learning (ML) model trained to estimate an impact of a reconfiguration of an antenna on a set of key performance indicators (KPIs) of a given cell and one or more neighbors of the given cell, one or more predicted KPIs using data characterizing a reconfiguration of a massive multiple-input multiple-output (M-MIMO) antenna. The network entity may provide the one or more predicted KPIs. Numerous other aspects are described.

30 Claims, 6 Drawing Sheets

(56) References Cited

U.S. PATENT DOCUMENTS

2024/0179566 A1* 5/2024 Lee .................... H04W 28/082

OTHER PUBLICATIONS

Anonymous: "O-RAN Working Group 2 (Non-RT RIC & A1 Interface). ORAN-WG2. Use Case Requirements v01.00", O-RAN Specifications, O-RAN, Jun. 1, 2019, XP009528794, pp. 1-29, p. 14-p. 17.
Huawei (Moderator): "SOD on Use Cases for SI on Data Collection", 3GPP TSG RAN WG3 #110-e, R3-206874, vol. R3-206874, Nov. 17, 2020, XP009540198, 18 pages, p. 5-p. 7.
International Search Report and Written Opinion—PCT/US2022/079929—ISA/EPO—Mar. 15, 2023.

* cited by examiner

MANAGING MASSIVE MIMO ANTENNAS IN A WIRELESS NETWORK

CROSS-REFERENCE TO RELATED APPLICATION

This Patent application claims priority to U.S. Provisional Patent Application No. 63/264,113, filed on Nov. 16, 2021, entitled "MANAGING MASSIVE MIMO ANTENNAS IN A WIRELESS NETWORK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for managing a wireless network and, in particular, to systems and methods of managing antennas, including massive Multiple-Input Multiple-Output (MIMO) antennas.

BACKGROUND

The ever-growing new services enabled by evolving wireless networks require fast and stable network connections. Massive multiple-input multiple-output (MIMO) technique improves the network capacity and the user's experience. Instead of broadcasting data throughout the entire coverage area, a massive MIMO system concentrates some portion of the signal energy to a specific user, resulting in significant improvement of throughput and efficiency. MIMO is a wireless communication technique that increases the capacity and quality of a wireless link by using a plurality of transmit and receive antennas to exploit multipath propagation.

Massive MIMO (M-MIMO) is term referring to the case where a base station (BS) or another form of radio unit is equipped with a large number of antenna elements (e.g., 64, 128, etc.). The antenna elements serve a number of user equipments (UEs) that is smaller than the number of antenna elements. The UEs share the same time and frequency band and are separated in the spatial domain. Massive MIMO is based upon three concepts: spatial diversity that increases the reliability of the radio link, spatial multiplexing increasing the capacity of the radio link, and beamforming enabling focusing a wireless signal in a specific direction. Thus, massive MIMO technology brings many advantages to the network operator.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
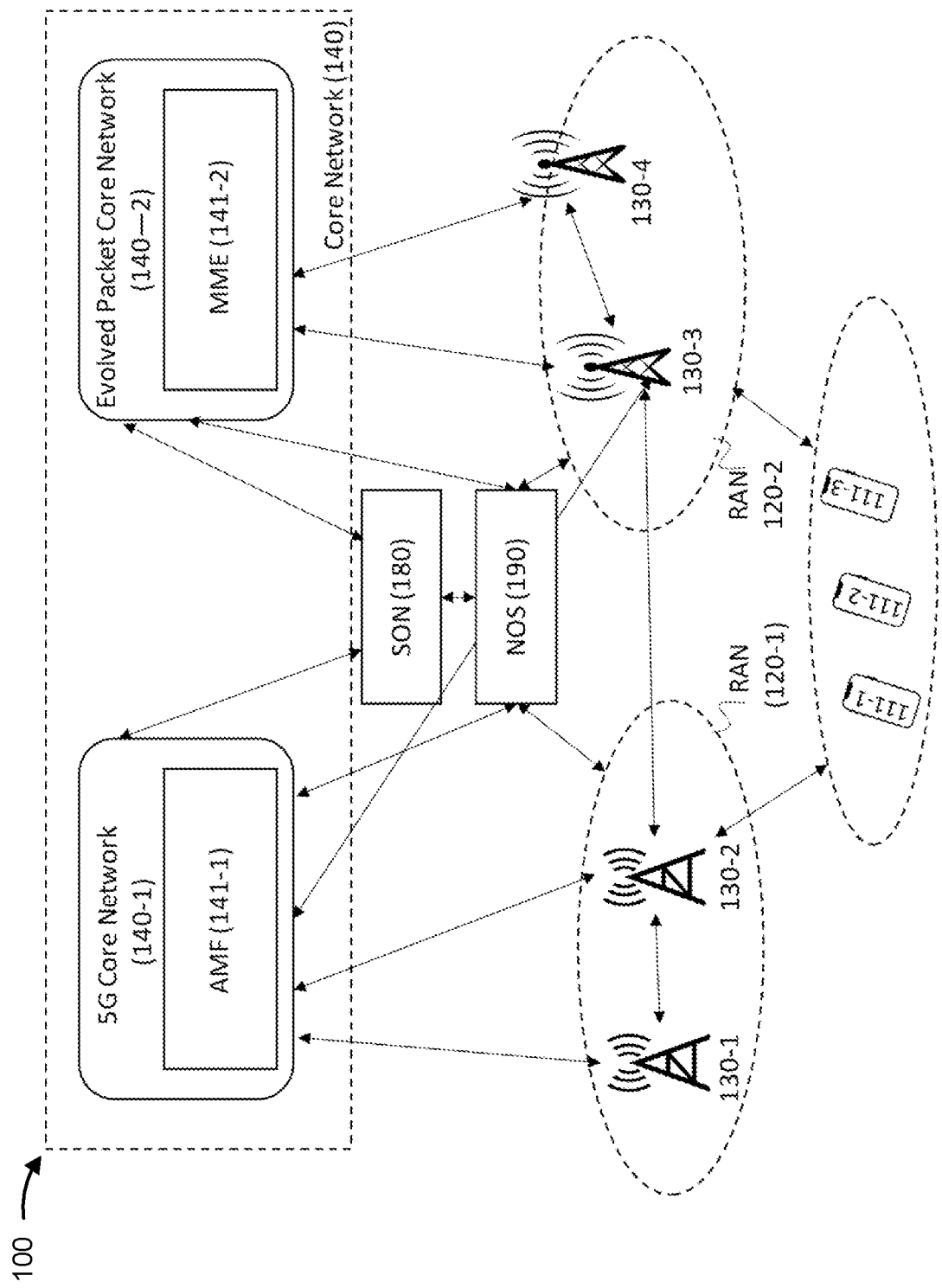
FIG. 1 is a diagram illustrating an example of a wireless network including a network optimization system (NOS), in accordance with the present disclosure.

Some aspects described herein relate to an apparatus. The apparatus may include a memory and one or more processors coupled to the memory. The one or more processors may be configured to calculate, using a machine learning (ML) model trained to estimate an impact of a reconfiguration of an antenna on a set of key performance indicators (KPIs) of a given cell and one or more neighbors of the given cell, one or more predicted KPIs using data characterizing a reconfiguration of a massive multiple-input multiple-output (M-MIMO) antenna. The one or more processors may be configured to provide the one or more predicted KPIs.

Some aspects described herein relate to a method of managing an antenna configuration in a wireless network. The method may include calculating, using an ML model trained to estimate an impact of a reconfiguration of an antenna on a set of KPIs of a given cell and one or more neighbors of the given cell, one or more predicted KPIs using data characterizing a reconfiguration of an M-MIMO antenna. The method may include providing the one or more predicted KPIs.

Some aspects described herein relate to a non-transitory computer-readable medium that stores a set of instructions for wireless communication. The set of instructions, when executed by one or more processors of the apparatus, may cause the apparatus to calculate, using an ML model trained to estimate an impact of a reconfiguration of an antenna on a set of KPIs of a given cell and one or more neighbors of the given cell, one or more predicted KPIs using data characterizing a reconfiguration of an M-MIMO antenna. The set of instructions, when executed by one or more processors of the apparatus, may cause the apparatus to provide the one or more predicted KPIs.

Some aspects described herein relate to an apparatus for wireless communication. The apparatus may include means for calculating, using an ML model trained to estimate an impact of a reconfiguration of an antenna on a set of KPIs of a given cell and one or more neighbors of the given cell, one or more predicted KPIs using data characterizing a reconfiguration of an M-MIMO antenna. The apparatus may include means for providing the one or more predicted KPIs.

Aspects generally include a method, apparatus, system, computer program product, non-transitory computer-readable medium, user equipment, base station, network entity, network node, network optimization system, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Unless specifically stated otherwise, as apparent from the following discussions, throughout the specification discussions utilizing terms such as "processing", "simulating", "providing", "applying", "obtaining", "training", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the Network Optimization System (NOS) disclosed in the present application.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100 including a network optimization system (NOS) 190, in accordance with the present disclosure. For purpose of illustration only, the following description is provided for embodiments implemented in a cellular network. Those skilled in the art will readily appreciate that the teachings of the presently disclosed subject matter are not bound by the network environment illustrated in FIG. 1 and can be implemented in other wireless network architectures and/or standards (e.g., Wi-Fi networks).

The wireless network 100 comprises one or more radio access networks (RANs) 120 denoted as RAN 120-1 and RAN 120-2. Each RAN 120 comprises a plurality of base stations 130 (denoted as base station 130-1 through base station 130-4). The base stations 130 can operate in different bands and/or using different radio access technologies (RATs). In some examples, base stations 130 can be provided by different vendors. A given base station 130 (e.g., an Evolved Universal Terrestrial Radio Access Network Node B, Evolved Universal Terrestrial Radio Access Network (E-UTRAN) Node B, evolved Node B, eNodeB, eNB, Next Generation Evolved Node B, Next Generation Node B, gNode B, gNB, one or more network nodes of a disaggregated base station, etc.) can implement a macrocell, microcell, small cell, picocell, or the like, or any combination or future evolution thereof.

The base stations 130 serve a plurality of user equipments (UEs) 111 (denoted UE 111-1 through UE 111-3). In some examples, a UE 111 may be in an operating mode (e.g., a radio resource control (RRC) connected mode) or in idle or inactive mode. The UEs may communicate with the base stations 130 via radio frequency (RF) channels allowing bidirectional transmission of voice and/or data between the base stations 130 (e.g., cells provided by the base stations 130) and UEs, such as in accordance with a cellular standard.

In the illustrated example, RAN 120-2 is an E-UTRAN and RAN 120-1 is a 5G NR RAN, though the techniques described herein can be implemented for other types or combinations of RANs 120.

The one or more RANs 120 are connected to one or more core networks 140. Core network 140 may comprise one or more core networks of different types. In wireless network 100, core network 140 comprises a 5th-Generation Core (5GC) network 140-1 and an Evolved Packet Core (EPC) network 140-2. Base stations 130-1 and 130-2 belong to 5G NR RAN 120-1 and may be connected to the 5GC 140-1 through an NG2 interface for control-plane signaling and an NG3 interface for user-plane data communications. Base stations (BSs) 130-3 and 130-4 belong to E-UTRAN 120-2 and may be connected to the EPC 140-2 using an Si interface for control-plane signaling and user-plane data communications. Some of the base stations 130 in E-UTRAN 120-2 (e.g., base station 130-3) can be connected to both the 5GC and EPC core networks. In addition to connections to core networks 140, the base stations 130 can communicate with each other via a backhaul connection.

The 5GC 140-1 may include an Access and Mobility Management Function (AMF) 141-1, which provides control-plane functions (e.g., registration and authentication of multiple UEs, authorization, mobility management, etc.) in the 5G NR network. The core network EPC 140-2 includes a Mobility Management Entity (MME) 141-2, which provides control-plane functions (e.g., registration and authentication of multiple UEs, authorization, mobility management, etc.) in the E-UTRAN network. AMF 141-1 and MME 141-2 communicate with the base stations 130 in the RANs and/or with UEs 111 via the base stations 130.

In some aspects, wireless network 100 may include a self-organizing network (SON) system 180. SON system 180 may be connected to AMF 141-1 and/or MME 141-2 (or at least partly integrated with AMF 141-1 and/or MME 141-2). SON system 180 can be further connected to BSs 130-1-130-5. SON system 180 can be configured to enable corrective actions (e.g., self-configuring which may include determining and implementing an initial configuration of BSs 130 or wireless network 100, self-optimizing which may include updating or optimizing a configuration of BSs 130 or wireless network 100, and/or self-healing which may include reconfiguring BSs 130 or wireless network 100 to resolve an issue such as an outage) with regard to one or more BSs 130 based at least in part on data related to the network environment and obtained by the SON system 180.

A site in a cellular network may include one or more base stations 130 which may be connected to multiple antennas, such as legacy antennas (e.g., non-MIMO, omnidirectional, etc.) and/or M-MIMO antennas. An M-MIMO antenna may include a number of antenna elements capable of supporting a large number (e.g., 64, 128, etc.) of MIMO layers. By utilizing the M-MIMO technology, a BS 130 may form a plurality of radio links with each of a plurality of UEs located in a horizontal and vertical space surrounding the base station 130.

In some aspects, an antenna of a base station 130 may be a sector antenna. A sector antenna may have a sector-shaped radiation pattern characterized by the horizontal direction to which the sector antenna points (referred to hereinafter as an azimuth) and a frequency. In some aspects, an antenna of a base station 130 may be an M-MIMO antenna (e.g., an M-MIMO antenna panel). An M-MIMO antenna pattern may have a shapeable radiation pattern characterized by an azimuth and various other parameters described elsewhere herein.

A site of a cellular network may be associated with (e.g., may provide) one or more cells. As used herein, unless indicated otherwise, "cell" refers to a logical object defined as a combination of a carrier frequency and a beam (whether a beam generated by an M-MIMO antenna or a sector-shaped radiation pattern generated by a sector antenna).

As shown, the wireless network 100 may include a network optimizing system (NOS) 190. In some aspects, NOS 190 may be a stand-alone system (operating online and/or offline) operatively connected to AMF 141-1 and/or MME 141-2 and/or SON system 180 and/or other relevant network or offline entities. In some aspects, NOS 190 may be, at least partly, integrated with the respective system(s) (e.g., AMF 141-1, MME 141-2, SON system 180). As will be further detailed with reference to FIGS. 2-4, NOS 190 may use a model trained using a machine learning algorithm to estimate an impact, on a given cell and/or neighbor cells of the given cell, of reconfiguring an M-MIMO antenna of a given cell. This estimated impact may be usable (e.g., by AMF 141-1, MME 141-2, SON system 180, etc.) for managing M-MIMO operation and optimizing the configuration of M-MIMO operation.

An M-MIMO configuration may include various parameters, such as one or more of a number of horizontal beams, a number of vertical beams, a horizontal beamwidth (HBW), a vertical beamwidth (VBW), a horizontal angle (PAN), a vertical angle (tilt), an M-MIMO use case (e.g., hot spot, medium rise building, high rise building, a ground level coverage (such as a square coverage area), etc.), a transmission (Tx) power, a combination thereof, or another parameter. An M-MIMO configuration (e.g., an optimized M-MIMO configuration) may be selected from a number of configuration combinations comprising one or more of the above parameters.

For example, an M-MIMO antenna may be configurable to use the following parameters:

HBW: 45 degrees (Deg) or 60 Deg.
VBW: 45-135 Deg, 10 Deg increments
H-space number of beams: 1 or 2.
V-space number of beams: 1.
Tilt: −1.0 Deg, 0.0 Deg, +1.0 Deg.
PAN: −10 Deg, 0.0 Deg, +10.0 Deg.
TX-Power [−1.0 dB, 0.0 dB, 1.0 dB].

For example, selecting a PAN=0.0 Deg value may cause this M-MIMO antenna to keep a prior PAN value. Selecting a PAN=+10.0 Deg value may cause this M-MIMO antenna to be reconfigured to an updated PAN setting which is incremented 10 Deg relative to a prior PAN value.

In the above example, the number of different possible M-MIMO reconfigurations for an M-MIMO antenna (e.g., cell) is 1080, which leads to 1080 options of configuration changes for a single M-MIMO antenna (e.g., cell). This M-MIMO optimization task becomes even more complicated in view of cross-interactions between neighboring cells, creating significant computing burden as, for example, a combinatorial optimization problem. Even for the above simplified example, the complexity can reach the order of $O(1080^N)$ where N is the number of jointly optimized cells.

Techniques described herein provide updating (e.g., optimization) of an M-MIMO configuration based at least in part on a machine learning model configured and/or trained in accordance with certain embodiments of the presently disclosed subject matter as detailed below. These techniques are applicable to online and/or offline optimization of antenna (e.g., M-MIMO antenna) configuration. In a case of offline optimization, network reconfigurations are first examined in the domain of the neural network (rather than in the real-world cellular network). A best reconfiguration of a group of cells is found, and may then be deployed to the real-world cellular network. This saves resources otherwise used for a trial and error on the cellular network itself with potentially poorly performing reconfigurations, thereby improving performance of the cellular network and reducing interruption of communications.

It is also noted that the disclosed subject matter is not limited to M-MIMO antennas and is therefore applicable to other antennas, such as sector antennas.

Figure 2:
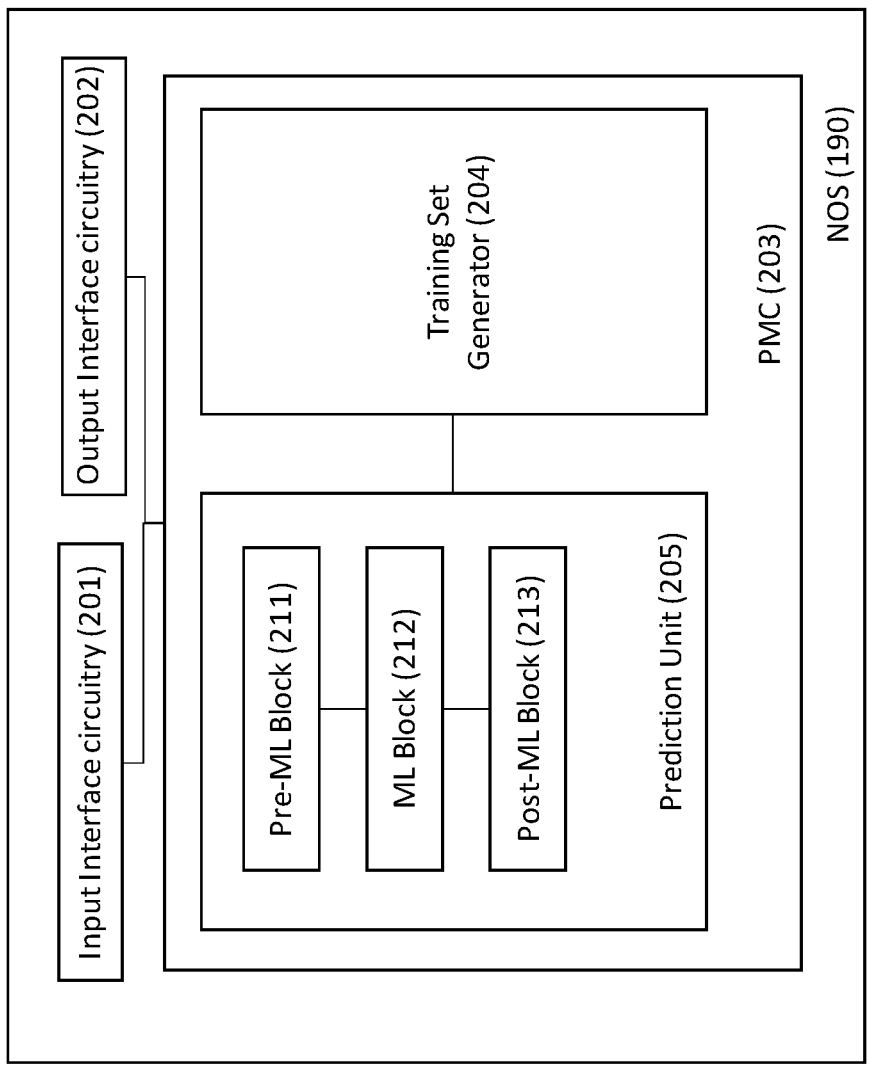
FIG. 2 is a diagram illustrating a block diagram of an NOS in accordance with the present disclosure.

FIG. 2 is a diagram illustrating a block diagram of NOS 190 in accordance with the present disclosure. NOS 190 comprises Processing and Memory Circuitry (PMC) 203 (e.g., memory 530 and/or processor 520, depicted in FIG. 5) connected to input interface circuitry 201 (e.g., one or more physical ports, input component 540, and/or communication component 560, depicted in FIG. 5) and output interface circuitry 202 (e.g., one or more physical ports, output component 550, and/or communication component 560, depicted in FIG. 5). NOS 190 can further comprise a graphical user interface enabling user-specified inputs related to its operating.

Input interface circuitry 201 may be configured to enable data communication necessary for receiving data regarding cells (e.g., antennas, M-MIMO antennas) and M-MIMO configuration thereof. Input interface circuitry 201 may provide the received data and/or derivatives thereof to PMC 203. PMC 203 may include a processor connected to a memory. PMC 203 or the processor thereof may be configured to provide processing of the received and/or stored data in accordance with operations described with reference to FIGS. 3-4. Output interface circuitry 202 may forward the results of the processing to one or more respective network entities (e.g., AMF 141-1, MME 141-2, SON system 180, etc.).

The processor of PMC 203 can be configured to execute functional blocks in accordance with computer-readable instructions implemented on a non-transitory computer-readable medium, which may, for example, be included in or comprise PMC 203.

PMC 203 may include a prediction unit 205 operatively connected to a training set generator 204. As will be further detailed with reference to FIGS. 3-4, prediction unit 205 may include a machine learning (ML) block 212. ML block 212 may include a machine learning model that is configured, upon training, to predict impact of M-MIMO antenna reconfiguration on a given cell (e.g., M-MIMO antenna) and/or neighbors thereof. As will be further detailed with reference to FIG. 4, training set generator 204 may be configured to generate data for training the machine learning model. Optionally, training set generator 204 can be implemented as a separate system configured to provide a generated training set to NOS 190 via input interface circuitry 201.

Prediction unit 205 may include pre-ML block 211 configured to provide pre-processing (e.g., normalization) before forwarding input data to ML block 212. Prediction unit 205 may include post-ML block 213 configured to provide post-processing for data generated by ML block 212 (e.g., customized presentation of the predicted impact).

Prediction unit 205 may be configured to receive, via input interface circuitry 201, data regarding an M-MIMO antenna configuration (e.g., a current M-MIMO antenna configuration) and one or more configuration changes. Upon processing the received data, prediction unit 205 may estimate a re-configuration impact. Prediction unit 205 may send the results via output interface circuitry 202 to the one or more network entities and/or one or more offline entities. For example, the predicted impact may indicate one or more predicted key performance indicators (KPIs) related to coverage, load, throughput, interference, and/or handoffs of the M-MIMO antenna (e.g., cell) and neighbors thereof.

The presently disclosed subject matter is not bound by the network optimization system illustrated in FIG. 2. Equivalent and/or modified functionality can be consolidated or divided in another manner and can be implemented in any appropriate combination of software with firmware and hardware. In some embodiments, training set generator 204 can be implemented as one or more standalone entities operating in conjunction with the NOS 190, or can be integrated, fully or partly, with other network entities. Optionally, at least part of the functionality of NOS 190 can be implemented in a cloud and/or distributed arrangement, such as a disaggregated RAN.

Figure 3:
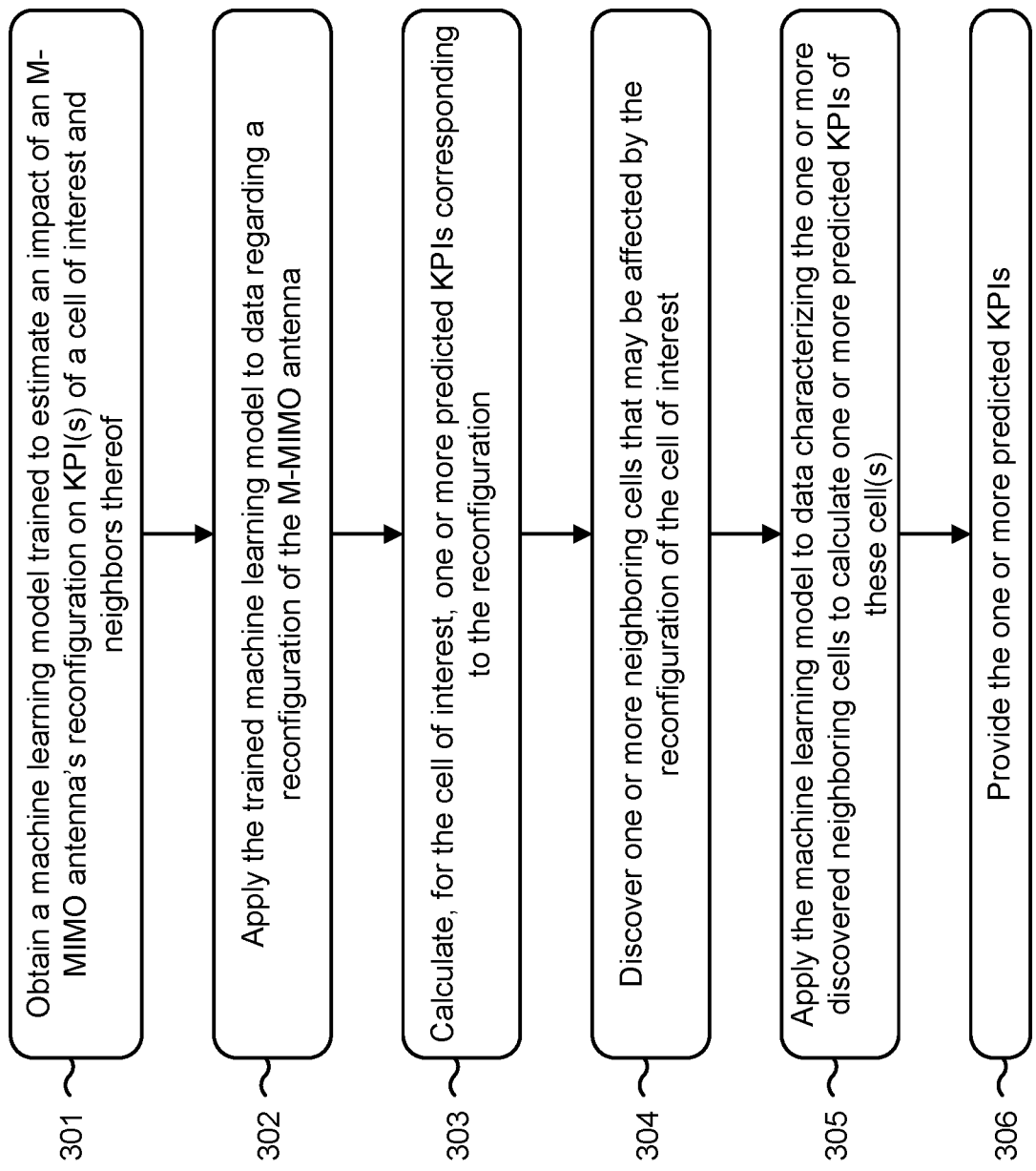
FIG. 3 illustrates an example flow-chart of operating an NOS, in accordance with the present disclosure.

FIG. 3 illustrates an example flow-chart of operating NOS 190. As shown by reference number 301, NOS 190 may obtain a machine learning model (e.g., ML model 400 of FIG. 4) trained to provide an estimated impact of an M-MIMO antenna's reconfiguration on one or more KPIs of a cell of interest and neighbors thereof. For example, NOS 190 may receive the machine learning model from another node. As another example, NOS 190 may train and/or update the machine learning model (such as using, or by communicating with, ML block 212 and/or training set generator 204 of FIG. 2, as described in connection with FIGS. 2 and 4). In some aspects, NOS 190 may generate a training set for training the machine learning model, as described in connection with training set generator 204 in the description of FIGS. 2 and 4. In some other aspects, NOS 190 may receive the training set (e.g., via input interface circuitry 201), as described in connection with FIG. 4. In some aspects, NOS 190 may use measured data for training of the machine learning model.

As shown by reference number 302, NOS 190 may apply the trained machine learning model (e.g., at pre-ML block 211 or ML block 212 of FIG. 2) to data regarding a reconfiguration of the M-MIMO antenna. For example, prediction unit 205 of NOS 190 may receive, via input interface circuitry 201, data regarding an M-MIMO antenna configuration (e.g., a current M-MIMO antenna configuration) and one or more configuration changes, as described in connection with FIG. 2. The data may include, for example, numerical input data, language-like input data, or a combination thereof, as described in connection with FIGS. 3 and 4, below.

As shown by reference number 303, NOS 190 may calculate, for the cell of interest, one or more predicted KPIs corresponding to the reconfiguration. For example, prediction unit 205 may estimate a reconfiguration impact based on data regarding an M-MIMO antenna configuration (e.g., a current M-MIMO antenna configuration) and one or more configuration changes. The aggregation/output ML sub-model 403 may provide a predicted impact of reconfiguration (e.g., an estimate of a reconfiguration impact) on one or more KPIs (e.g., one or more next states of the M-MIMO antenna), referred to herein as one or more predicted KPIs. In some aspects, aggregation and output functions of aggregating/output ML sub-model 403 can be provided by separate consecutively connected sub-models. The one or more predicted KPIs may indicate at least one of a coverage parameter (e.g., a ratio or indication of coverage of a cell), a load parameter (e.g., an indication of a predicted load on a cell), a throughput parameter (e.g., an indication of a predicted throughput of a cell), an interference parameter (e.g., an indication of a predicted interference of a cell), an inter-beam handoff parameter (e.g., a prediction of whether or how often an inter-beam handoff will occur), an inter-site handoff parameter (e.g., a prediction of whether or how often an inter-site handoff will occur), a combination thereof, or other information.

In some aspects, as shown by reference number 304, NOS 190 may discover one or more neighboring cells that may be affected by the reconfiguration of the cell of interest. For example, NOS 190 may identify a neighboring cell with a parameter (e.g., a predicted KPI) that indicates an impact of the reconfiguration on the neighboring cell that satisfies a threshold. In some aspects, the parameter that indicates the impact may be a score (e.g., a score, for a neighbor cell and a given M-MIMO configuration, indicating an impact of a M-MIMO configuration or reconfiguration on the neighbor cell). In some aspects, NOS 190 may identify the neighboring cell based on the one or more predicted KPIs corresponding to the reconfiguration. For example, NOS 190 may identify that a predicted coverage parameter indicates that the neighboring cell is likely to be subject to interference from the reconfiguration. As another example, NOS 190 may identify that a predicted handover parameter indicates that the neighboring cell is likely to experience a threshold number of handovers from the cell of interest.

As shown by reference number 305, NOS 190 may apply the machine learning model to data characterizing the one or more discovered neighboring cells to calculate one or more predicted KPIs of these cell(s). For example, prediction unit 205 may estimate a re-configuration impact based on data regarding an M-MIMO antenna configuration (e.g., a current M-MIMO antenna configuration) and one or more configuration changes relating to the effect of the reconfiguration of the cell of interest on the one or more neighboring cells. The aggregation/output ML sub-model 403 may provide a predicted impact of the reconfiguration on one or more KPIs (e.g., one or more next states of the M-MIMO antenna), referred to herein as one or more predicted KPIs. For example, the machine learning model may predict impact of M-MIMO antenna reconfiguration on a neighbor cell of the cell of interest. The predicted impact may indicate one or more predicted KPIs, which may include any one or more parameters described above as a predicted KPI at reference number 303.

As shown by reference number 306, NOS 190 (e.g., the aggregation/output ML sub-model 403 or prediction unit 205) may further provide the one or more predicted KPIs (and/or derivatives thereof), such as for use in an M-MIMO optimization scenario. For example, prediction unit 205 may send results (e.g., the one or more predicted KPIs and/or derivatives thereof) via output interface circuitry 202 to one or more network entities and/or one or more offline entities. As another example, NOS 190 may control or optimize a RAN element or resource, or may provide policy-based guidance of application and/or features for a near-real-time RAN intelligent controller, as described in connection with FIG. 6. The one or more predicted KPIs may indicate at least one of a coverage parameter (e.g., a ratio or indication of coverage of a cell), a load parameter (e.g., an indication of a predicted load on a cell), a throughput parameter (e.g., an indication of a predicted throughput of a cell), an interference parameter (e.g., an indication of a predicted interference of a cell), an inter-beam handoff parameter (e.g., a prediction of whether or how often an inter-beam handoff will occur), an inter-site handoff parameter (e.g., a prediction of whether or how often an inter-site handoff will occur), a combination thereof, or other information.

In some aspects, the machine learning model can be trained to provide M-MIMO reconfiguration parameters enabling one or more KPIs matching predefined criteria. Thus, the machine learning model may enable reconfiguration of an M-MIMO antenna such that the one or more KPIs of the M-MIMO antenna match the predefined criteria. In some aspects, NOS 190 or another entity may apply an optimization algorithm (e.g., an iterative greedy algorithm) to a group (e.g., cluster) of cells to optimize, for the group of cells, one or more KPI based criteria, which may be predefined for the group of cells. In such aspects, outputs of the machine learning model may be used as inputs to the optimization algorithm to perform offline optimization as mentioned above. An example of a KPI based criterion is to maximize the average throughput of a group of cells while not degrading their coverage. Another example of a KPI based criterion is to maximize the worst-case average UE throughput without degrading coverage, where the average worst case UE throughput may be defined as the average of the worst 5% of UE throughputs (e.g., the worst fifth percentile) in the group of cells. The optimization algorithm may iterate through cells of the group of cells using one or more M-MIMO configurations. For each cell of the group of cells, the optimization algorithm may output a score for each of the one or more M-MIMO configurations. For example, given N cells in the group of cells and M M-MIMO configurations, the optimization algorithm may determine M*N scores at each iteration. The score, for a cell and a given M-MIMO configuration, may indicate an impact of the given M-MIMO configuration on the given cell of the set of cells.

At a given iteration, the optimization algorithm may select a configuration with a best score (e.g., a configuration that has a lowest aggregate impact on the cells of the group of cells) according to a cost function. The cost function may take into account, for example, weights of the scores (e.g., with regard to coverage, capacity, interference, and so on). In a next iteration after the given iteration, an input to the optimization algorithm may be the selected configuration from the given iteration. Thus, a configuration of a set of cells (e.g., a set of M-MIMO antennas associated with the set of cells) is configured (e.g., optimized) iteratively.

The machine learning model is further detailed with reference to FIG. 4. The machine learning model can be trained using supervised learning with a measured set of data, a simulated training set, or a training set comprising a mix of simulated and measured data.

Using measured data for training may include obtaining KPIs of a group of cells before and after a cell of the group of cells is reconfigured. The KPIs may include any one or more of the KPIs described elsewhere herein, such as coverage (which can be inferred from reporting of the number of RRC connected users of each cell), throughput, number of handoffs, and so on. These KPIs may be reported by the cell (e.g., periodically, on demand).

In some aspects, the machine learning model may be trained using a simulated approach. For example, a network node (e.g., NOS 190) may generate models of a plurality of cellular networks. The network node may simulate radio propagation (e.g., using a predefined model for path loss, antenna coverage, or the like) for a number of UEs of a model of a cellular network, of the models of the plurality of cellular networks. The network node may define, for one or more pairs of cells (e.g., beams) of the cellular network, one or more KPIs based at least in part on the simulated radio propagation. The network node may generate a training set including one or more training samples informative of association between data characterizing a given cell and one or more neighbor cells of the given cell, and one or more values of the one or more KPIs for one or more cells pairs including the given cell and the one or more neighbor cells of the given cell. In some aspects, the network node may train a machine learning model using the training set. The machine learning model may output one or more KPIs based on input data characterizing a set of cells. In some aspects, the network node may simulate the radio propagation (e.g., using the model for path loss, antenna coverage, or the like) offline, such as separately from a reconfiguration or optimization operation, or separately from usage of the machine learning model to reconfigure the network.

In some aspects, numerical values of M-MIMO configuration parameters can be represented as a set of M-MIMO configuration states. An M-MIMO configuration state may be characterized by a unique combination of numerical values of M-MIMO configuration parameters.

As described elsewhere herein, an example M-MIMO antenna can have the following set of values of the M-MIMO configuration parameters: HBW: 45 Deg or 60 Deg; VBW: 45-135 Deg w/10 Deg increment; H-space number of beams: 1 or 2; V-space number of beams: 1; Tilt: −1.0 Deg, 0.0 Deg, +1.0 Deg; PAN: −10 Deg, 0.0 Deg, +10.0 Deg, Tx power [−1.0 dB, 0.0, 1.0 dB].

Table 1 provides an example of M-MIMO states corresponding to the above M-MIMO configuration parameters.

TABLE 1

| M-MIMO State | HBW | VBW | H-space # of beams | V-space # of beams | PAN | Tilt | Tx power |
|---|---|---|---|---|---|---|---|
| 1 | 45 | 45 | 1 | 1 | −10 | −1 | −1 |
| 2 | 60 | 55 | 1 | 1 | −10 | −1 | −1 |
| 3 | 45 | 65 | 2 | 1 | −10 | +1 | −1 |
| ... | ... | ... | ... | ... | ... | ... | |
| 31 | 60 | 45 | 1 | 1 | +10 | +2 | 0 |
| ... | ... | ... | ... | ... | ... | ... | |
| 511 | 60 | 135 | 2 | 1 | +10 | +2 | 1 |
| ... | ... | ... | ... | ... | ... | ... | |
| 1080 | 60 | 45 | 2 | 1 | 0 | 0 | 1 |

A set of M-MIMO states may be associated with a set of possible transitions from state to state (e.g., the above illustrated set of M-MIMO configuration states corresponds to 432 possible transitions from state to state). Each possible transition can be associated with a transition identifier (ID). In some aspects, the M-MIMO states and transitions may be considered as language-like elements and may be processed using natural language processing (NLP) techniques. For example, the language-like elements may include a set of elements that correspond to a set of transition parameters (e.g., one element per transition parameter). A set of elements corresponding to a set of transition parameters may be identified by a transition ID.

In some aspects, the ML model in ML block 212 may be configured to process numerical input data characterizing M-MIMO configuration parameters separately from, and parallel to (e.g., at the same as, in the same processing step as), the language-like input data related to possible transitions between M-MIMO configuration states, as described below.

Figure 4:
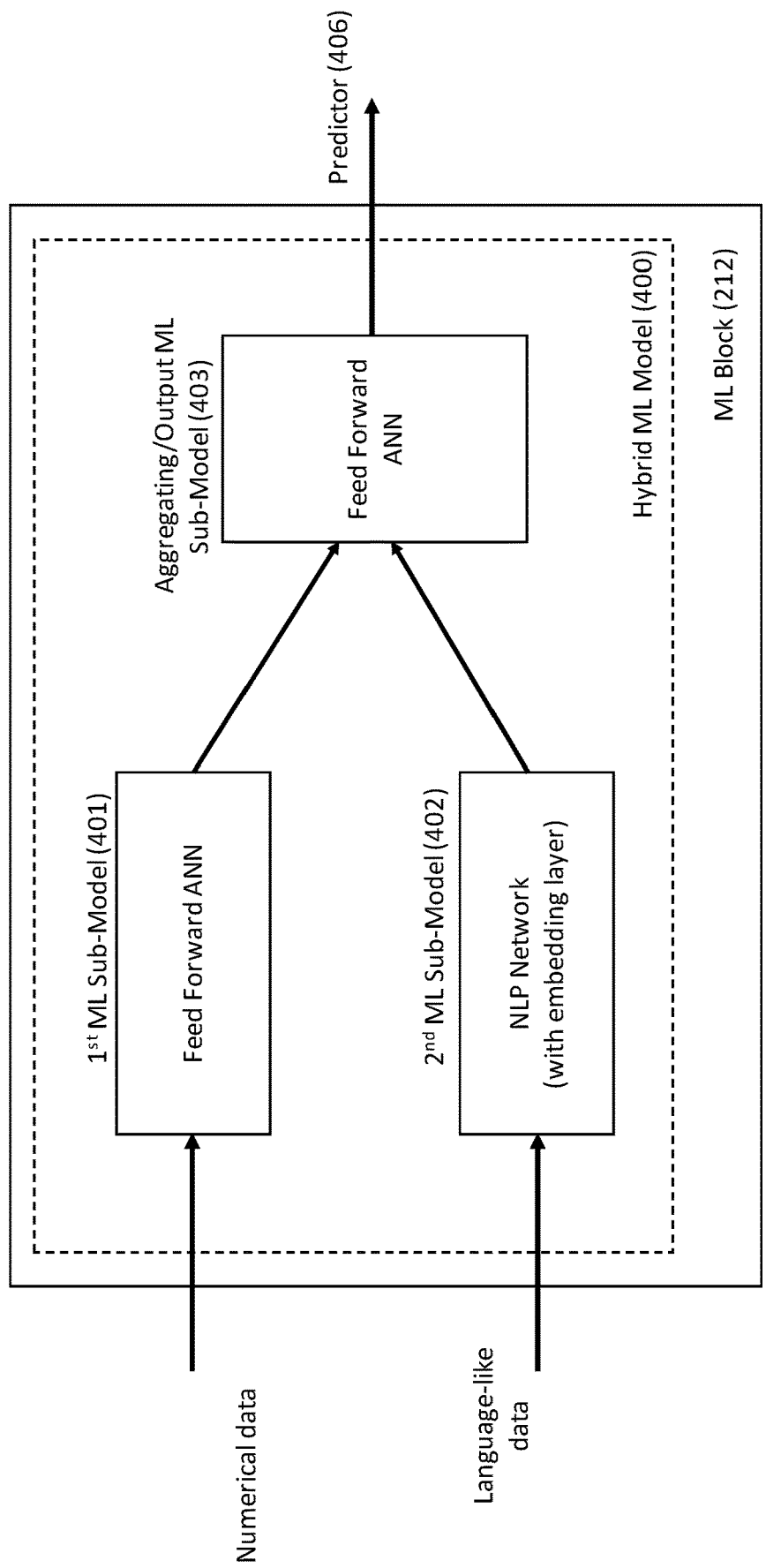
FIG. 4 is a diagram illustrating an example of a hybrid machine learning model, in accordance with the present disclosure.

FIG. 4 is a diagram illustrating an example of a hybrid ML model 400. The ML block 212 illustrated in FIG. 4 comprises the hybrid ML model 400. The hybrid ML model 400 may include a first input ML sub-model 401 configured to process numerical input data and a second input ML sub-model 402 configured to contextually process language-like input data to recognize a preceding transition and to predict one or more next states of the M-MIMO antenna. The architecture of a given input ML-model corresponds to a type of input data of the given input ML-model.

The output of the first input ML sub-model 401 may indicate information regarding a radio-link-related environment. In some aspects, the output of the first input ML sub-model 401 may be obtained separately from (e.g., and in parallel to) an output of the second input ML sub-model 402. The output of the second input ML sub-model 402 may indicate a preceding configuration transition, such as a transition identifier associated with the preceding configuration transition. The preceding configuration transition may be a transition leading to a current M-MIMO configuration inputted to the hybrid ML model 400.

The outputs of the input ML-models 401 and 402 may be used as inputs of an aggregating/output ML sub-model 403. The aggregation/output ML sub-model 403 may process the received data. The aggregation/output ML sub-model 403 may provide a predicted impact of reconfiguration on one or more KPIs (e.g., one or more next states of the M-MIMO antenna). In some aspects, aggregation and output functions of aggregating/output ML sub-model 403 can be provided by separate consecutively connected sub-models.

In some aspects, the sub-models 401, 402, and 403 may be jointly trained based on a shared training set and on a cost-function characterizing the hybrid ML model 400.

The following description of ML block 212 is provided for an embodiment implementing ML sub-models with the help of neural networks (NNs). The teachings of the presently disclosed subject matter are, likewise, applicable to other suitable supervised machine learning models, such as random forest models, gradient boosting models, or the like.

Each layer of a given NN can include multiple basic computational elements (CEs), sometimes referred to as dimensions, neurons, or nodes. CEs of a given layer can be connected with CEs of a preceding layer and/or a subsequent layer.

In some aspects, NNs for predicting different KPIs may have shared layers. For example, one or more first layers can be shared between an NN that estimates reconfiguration impact on coverage and an NN that estimates reconfiguration impact on throughput. In some aspects, all layers excluding a last layer may be shared. In such aspects, these layers may feed two different output layers (sometimes referred to as "heads"): a first output layer for estimating coverage and a second output layer for estimating throughput. These output layers may comprise different heads for different KPIs (e.g., for determination of different KPIs). In some aspects, an output layer may include multiple layers (e.g., more than a last layer of an NN). This approach, in which one or more layers are shared between multiple NNs (sometimes referred to as a common layer approach) may reduce resource consumption associated with training, since one or more shared layers would be trained based on both coverage and throughput labels in the above example.

The connections between CEs are associated with weighting values and threshold values. The weighting and/or threshold values of an NN can be initially selected prior to training, and can be further iteratively adjusted or modified during training (e.g., using an ML technique) to achieve a reconfigured (e.g., optimal) set of weighting and/or threshold values in the trained NN. After each training iteration, there is determined an error value indicative of a difference between the actual output produced by NN and a target output. Training can be determined to be complete when a cost function indicative of the error value is less than a predetermined value or when a limited change in performance (e.g., lower than a threshold) between iterations is achieved.

A set of input data used to adjust the weights/thresholds of the neural network is referred to herein as a training set. The training set for ML model 400 can be generated by training set generator 204 and/or received via input interface circuitry 201. By way of non-limiting example, ML sub-model 401 and ML sub-model 403 can be implemented as feed forward artificial neural networks (ANNs), each comprising a plurality of layers organized in accordance with one or more ANN architectures. For example, each ANN can comprise an input layer, an output layer, and one or more (e.g., 2 to 5) hidden layers between the input layer and the output layer. The teachings of the presently disclosed subject matter are not bound by the number of hidden layers and/or the architecture thereof.

The ML sub-model 402 can be implemented as an NLP NN with embedding capabilities. NLP NN may be configured to recognize a preceding transition and to provide a context-based prediction of the new M-MIMO state.

Figure 5:
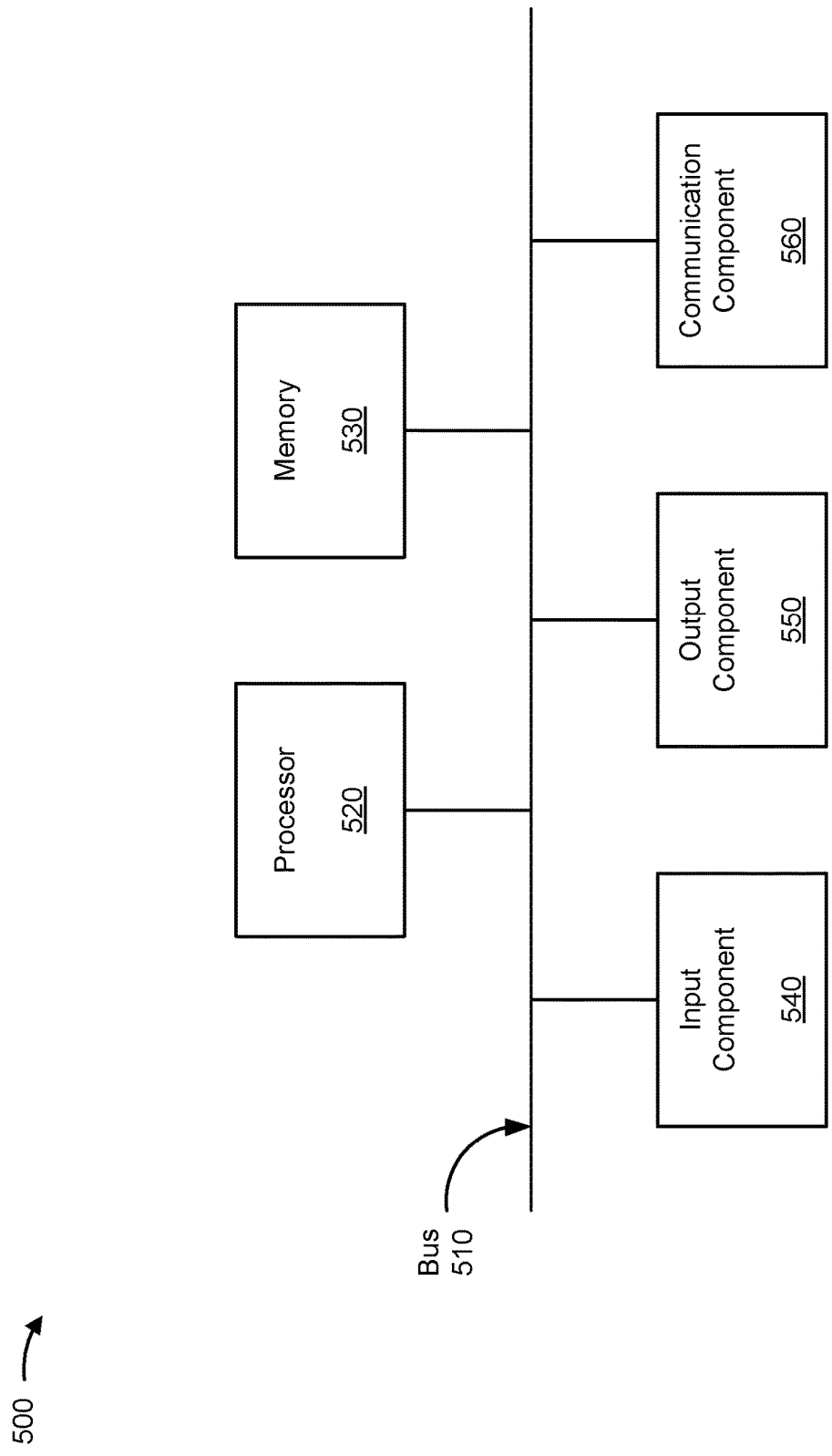
FIG. 5 is a diagram of example components of a device associated with managing massive MIMO antennas in a wireless network, in accordance with the present disclosure.

FIG. 5 is a diagram of example components of a device 500 associated with managing massive MIMO antennas in a wireless network. The device 500 may correspond to NOS 190. In some implementations, NOS 190 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hard-wired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
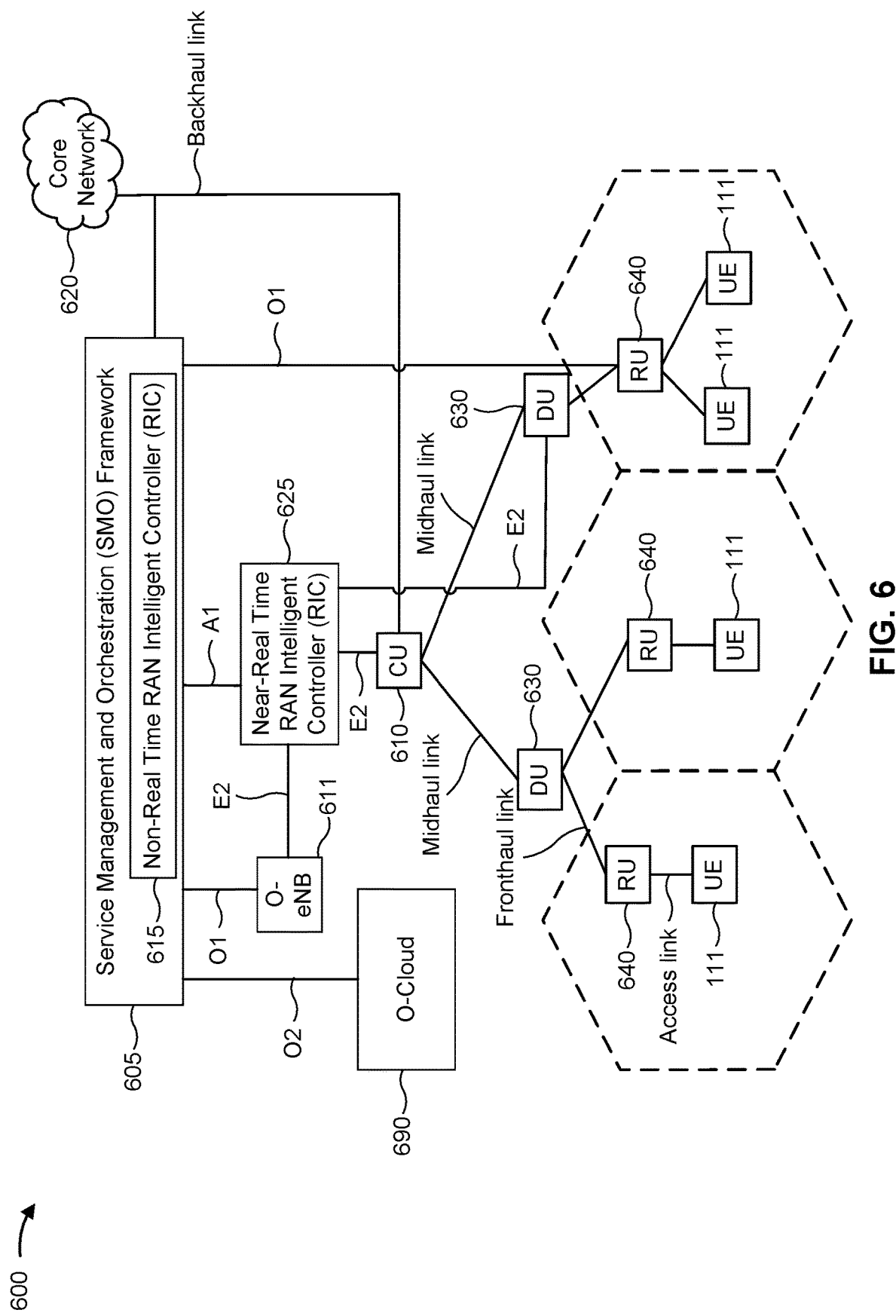
FIG. 6 is a diagram illustrating an example disaggregated base station architecture, in accordance with the present disclosure.

FIG. 6 is a diagram illustrating an example disaggregated base station architecture 600, in accordance with the present disclosure. The disaggregated base station architecture 600 may include a CU 610 that can communicate directly with a core network 620 via a backhaul link, or indirectly with the core network 620 through one or more disaggregated control units (such as a Near-RT RAN intelligent controller (MC) 625 via an E2 link, or a Non-RT MC 615 associated with a Service Management and Orchestration (SMO) Framework 605, or both). A CU 610 may communicate with one or more DUs 630 via respective midhaul links, such as through F1 interfaces. Each of the DUs 630 may communicate with one or more RUs 640 via respective fronthaul links. Each of the RUs 640 may communicate with one or more UEs 111 via respective radio frequency (RF) access links. In some implementations, a UE 111 may be simultaneously served by multiple RUs 640.

Each of the units, including the CUs 610, the DUs 630, the RUs 640, as well as the Near-RT RICs 625, the Non-RT RICs 615, and the SMO Framework 605, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 610 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 610. The CU 610 may be configured to handle user plane functionality (for example, Central Unit—User Plane (CU-UP) functionality), control plane functionality (for example, Central Unit—Control Plane (CU-CP) functionality), or a combination thereof. In some implementations, the CU 610 can be logically split into one or more CU-UP units and one or more CU-CP units. A CU-UP unit can communicate bidirectionally with a CU-CP unit via an interface, such as the E1 interface when implemented in an open RAN (O-RAN) configuration. The CU 610 can be implemented to communicate with a DU 630, as necessary, for network control and signaling.

Each DU 630 may correspond to a logical unit that includes one or more base station functions to control the operation of one or more RUs 640. In some aspects, the DU 630 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 630 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 630, or with the control functions hosted by the CU 610.

Each RU 640 may implement lower-layer functionality. In some deployments, an RU 640, controlled by a DU 630, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 640 can be operated to handle over the air (OTA) communication with one or more UEs 111. In some implementations, real-time and non-real-time aspects of control and user plane communication with the RU(s) 640 can be controlled by the corresponding DU 630. In some scenarios, this configuration can enable each DU 630 and the CU 610 to be implemented in a cloud-based RAN architecture, such as a vRAN architecture.

The SMO Framework 605 may be configured to support RAN deployment and provisioning of non-virtualized and virtualized network elements. For non-virtualized network elements, the SMO Framework 605 may be configured to support the deployment of dedicated physical resources for RAN coverage requirements, which may be managed via an operations and maintenance interface (such as an O1 interface). For virtualized network elements, the SMO Framework 605 may be configured to interact with a cloud computing platform (such as an open cloud (O-Cloud) platform 690) to perform network element life cycle management (such as to instantiate virtualized network elements) via a cloud computing platform interface (such as an O2 interface). Such virtualized network elements can include, but are not limited to, CUs 610, DUs 630, RUs 640, non-RT RICs 615, and Near-RT RICs 625. In some implementations, the SMO Framework 605 can communicate with a hardware aspect of a 4G RAN, such as an open eNB (O-eNB) 611, via an O1 interface. Additionally, in some implementations, the SMO Framework 605 can communicate directly with each of one or more RUs 640 via a respective O1 interface. The SMO Framework 605 also may include a Non-RT RIC 615 configured to support functionality of the SMO Framework 605.

The Non-RT RIC 615 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 625. In some aspects, the non-RT RIC 615 may include or be associated with a NOS 190. The Non-RT RIC 615 may be coupled to or communicate with (such as via an A1 interface) the Near-RT MC 625. The Near-RT RIC 625 may be configured to include a logical function that enables near-real-time control and optimization of RAN elements and resources via data collection and actions over an interface (such as via an E2 interface) connecting one or more CUs 610, one or more DUs 630, or both, as well as an O-eNB, with the Near-RT RIC 625.

In some implementations, to generate AI/ML models to be deployed in the Near-RT RIC 625, the Non-RT RIC 615 may receive parameters or external enrichment information from external servers. Such information may be utilized by the Near-RT RIC 625 and may be received at the SMO Framework 605 or the Non-RT RIC 615 from non-network data sources or from network functions. In some examples, the Non-RT RIC 615 or the Near-RT RIC 625 may be configured to tune RAN behavior or performance. For example, the Non-RT RIC 615 may monitor long-term trends and patterns for performance and employ AI/ML models to perform corrective actions through the SMO Framework 605 (such as reconfiguration via an O1 interface) or via creation of RAN management policies (such as A1 interface policies).

As indicated above, FIG. 6 is provided as an example. Other examples may differ from what is described with regard to FIG. 6.

The following provides an overview of some Aspects of the present disclosure:

Aspect 1: A method of managing an antenna configuration in a wireless network, comprising: calculating, using a machine learning (ML) model trained to estimate an impact of a reconfiguration of an antenna on a set of key performance indicators (KPIs) of a given cell and one or more neighbors of the given cell, one or more predicted key performance indicators (KPIs) using data characterizing a reconfiguration of a massive multiple-input multiple-output (M-MIMO) antenna; and providing the one or more predicted KPIs.

Aspect 2: The method of Aspect 1, wherein the data characterizing the reconfiguration of the M-MIMO antenna includes a set of first input data characterizing M-MIMO configuration parameters and a set of second input data related to one or more transitions between M-MIMO configuration states.

Aspect 3: The method of Aspect 2, wherein the ML model comprises a first input ML sub-model configured to process the set of first input data, a second input ML sub-model configured to process the set of second input data, and a third ML sub-model configured to aggregate an output of the first input ML sub-model and an output of the second input ML sub-model.

Aspect 4: The method of Aspect 3, wherein the output of the first input ML sub-model includes information regarding a radio link environment and the output of the second input ML sub-model includes information regarding a preceding configuration transition and one or more next states of the M-MIMO antenna.

Aspect 5: The method of Aspect 4, wherein the first input ML sub-model is configured as a feed forward artificial neural network, the second input ML sub-model is configured as a natural language processing neural network, and the third ML sub-model is configured as a feed forward artificial neural network.

Aspect 6: The method of Aspect 2, wherein the first input ML sub-model and the second input ML sub-model are configured to process the set of first input data and the set of second input data in parallel.

Aspect 7: The method of Aspect 2, wherein the set of second input data comprises a natural language processing based representation of the one or more transitions.

Aspect 8: The method of any of Aspects 1-7, wherein the one or more predicted KPIs include at least one of: a coverage parameter, a load parameter, a throughput parameter, an interference parameter, an inter-beam handoff parameter, an inter-site handoff parameter, or a combination thereof.

Aspect 9: The method of any of Aspects 1-8, further comprising training the ML model.

Aspect 10: The method of Aspect 8, wherein training the ML model further comprises training the first input ML sub-model, the second input ML sub-model, and the third ML sub-model jointly.

Aspect 11: The method of any of Aspects 1-9, wherein providing the one or more predicted KPIs further comprises providing the one or more predicted KPIs as an input to an algorithm to optimize a KPI based criterion of a group of cells.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus, comprising:
a memory; and
one or more processors, coupled to the memory, configured to:
calculate, using a machine learning (ML) model trained to estimate an impact of a reconfiguration of an antenna on a set of key performance indicators (KPIs) of a given cell and one or more neighbors of the given cell, one or more predicted KPIs using data characterizing a reconfiguration of a massive multiple-input multiple-output (M-MIMO) antenna, wherein the ML model comprises:
a first input ML sub-model configured as a feed forward artificial neural network configured to process a set of first input data;
a second input ML sub-model configured as a natural language processing neural network configured to process a set of second input data; and
a third ML sub-model configured as a feed forward artificial neural network configured to aggregate an output of the first input ML sub-model and an output of the second input ML sub-model; and
provide the one or more predicted KPIs for update of the M-MIMO antenna based on the ML model.

2. The apparatus of claim 1,
wherein the data characterizing the reconfiguration of the M-MIMO antenna includes the set of first input data characterizing M-MIMO configuration parameters and the set of second input data related to one or more transitions between M-MIMO configuration states.

3. The apparatus of claim 2,
wherein the output of the first input ML sub-model includes information regarding a radio link environment and the output of the second input ML sub-model includes information regarding a preceding configuration transition and one or more next states of the M-MIMO antenna.

4. The apparatus of claim 1,
wherein the first input ML sub-model and the second input ML sub-model are configured to process the set of first input data and the set of second input data in parallel.

5. The apparatus of claim 2,
wherein the set of second input data comprises a natural language processing based representation of the one or more transitions.

6. The apparatus of claim 1,
wherein the one or more predicted KPIs include at least one of:
a coverage parameter,
a load parameter,
a throughput parameter,
an interference parameter,
an inter-beam handoff parameter,
an inter-site handoff parameter, or
a combination thereof.

7. The apparatus of claim 1,
wherein the one or more processors are further configured to train the ML model.

8. The apparatus of claim 7, wherein the one or more processors, to train the ML model, are configured to train the first input ML sub-model, the second input ML sub-model, and the third ML sub-model of the ML model jointly.

9. The apparatus of claim 1,
wherein the one or more processors, to provide the one or more predicted KPIs, are configured to provide the one or more predicted KPIs as an input to an algorithm to optimize a KPI based criterion of a group of cells.

10. A method of managing an antenna configuration in a wireless network, comprising:
calculating, using a machine learning (ML) model trained to estimate an impact of a reconfiguration of an antenna on a set of key performance indicators (KPIs) of a given cell and one or more neighbors of the given cell, one or more predicted KPIs using data characterizing a reconfiguration of a massive multiple-input multiple-output (M-MIMO) antenna, wherein the ML model comprises:
a first input ML sub-model configured as a feed forward artificial neural network configured to process a set of first input data;
a second input ML sub-model configured as a natural language processing neural network configured to process a set of second input data; and
a third ML sub-model configured as a feed forward artificial neural network configured to aggregate an output of the first input ML sub-model and an output of the second input ML sub-model; and
providing the one or more predicted KPIs for updating the M-MIMO antenna based on the ML model.

11. The method of claim 10,
wherein the data characterizing the reconfiguration of the M-MIMO antenna includes the set of first input data characterizing M-MIMO configuration parameters and the set of second input data related to one or more transitions between M-MIMO configuration states.

12. The method of claim 11,
wherein the output of the first input ML sub-model includes information regarding a radio link environment and the output of the second input ML sub-model includes information regarding a preceding configuration transition and one or more next states of the M-MIMO antenna.

13. The method of claim 10,
wherein the first input ML sub-model and the second input ML sub-model are configured to process the set of first input data and the set of second input data in parallel.

14. The method of claim 11,
wherein the set of second input data comprises a natural language processing based representation of the one or more transitions.

15. The method of claim 10,
wherein the one or more predicted KPIs include at least one of:
a coverage parameter,
a load parameter,
a throughput parameter,
an interference parameter,
an inter-beam handoff parameter,
an inter-site handoff parameter, or
a combination thereof.

16. The method of claim 10, further comprising training the ML model.

17. The method of claim 16, wherein training the ML model further comprises training at least the first input ML sub-model and the second input ML sub-model jointly.

18. The method of claim 10,
wherein providing the one or more predicted KPIs further comprises providing the one or more predicted KPIs as an input to an algorithm to optimize a KPI based criterion of a group of cells.

19. A non-transitory computer-readable medium storing a set of instructions for wireless communication, the set of instructions comprising:
one or more instructions that, when executed by one or more processors of an apparatus, cause the apparatus to:
calculate, using a machine learning (ML) model trained to estimate an impact of a reconfiguration of an antenna on a set of key performance indicators (KPIs) of a given cell and one or more neighbors of the given cell, one or more predicted KPIs using data characterizing a reconfiguration of a massive multiple-input multiple-output (M-MIMO) antenna, wherein the ML model comprises:
a first input ML sub-model configured as a feed forward artificial neural network configured to process a set of first input data;
a second input ML sub-model configured as a natural language processing neural network configured to process a set of second input data; and
a third ML sub-model configured as a feed forward artificial neural network configured to aggregate an output of the first input ML sub-model and an output of the second input ML sub-model; and
provide the one or more predicted KPIs for update of the M-MIMO antenna based on the ML model.

20. The non-transitory computer-readable medium of claim 19,
wherein the data characterizing the reconfiguration of the M-MIMO antenna includes the set of first input data characterizing M-MIMO configuration parameters and the set of second input data related to one or more transitions between M-MIMO configuration states.

21. The non-transitory computer-readable medium of claim 20,
wherein the output of the first input ML sub-model includes information regarding a radio link environment and the output of the second input ML sub-model includes information regarding a preceding configuration transition and one or more next states of the M-MIMO antenna.

22. The non-transitory computer-readable medium of claim 20,
wherein the set of second input data comprises a natural language processing based representation of the one or more transitions.

23. The non-transitory computer-readable medium of claim 19,
wherein the first input ML sub-model and the second input ML sub-model are configured to process the set of first input data and the set of second input data in parallel.

24. The non-transitory computer-readable medium of claim 19,
wherein the one or more predicted KPIs include at least one of:
a coverage parameter,
a load parameter,
a throughput parameter,
an interference parameter,
an inter-beam handoff parameter,
an inter-site handoff parameter, or
a combination thereof.

25. An apparatus for wireless communication, comprising:
means for calculating, using a machine learning (ML) model trained to estimate an impact of a reconfiguration of an antenna on a set of key performance indicators (KPIs) of a given cell and one or more neighbors of the given cell, one or more predicted KPIs using data characterizing a reconfiguration of a massive multiple-input multiple-output (M-MIMO) antenna, wherein the ML model comprises:
a first input ML sub-model configured as a feed forward artificial neural network configured to process a set of first input data;
a second input ML sub-model configured as a natural language processing neural network configured to process a set of second input data; and
a third ML sub-model configured as a feed forward artificial neural network configured to aggregate an output of the first input ML sub-model and an output of the second input ML sub-model; and
means for providing the one or more predicted KPIs for updating the M-MIMO antenna based on the ML model.

26. The apparatus of claim 25,
wherein the data characterizing the reconfiguration of the M-MIMO antenna includes the set of first input data characterizing M-MIMO configuration parameters and the set of second input data related to one or more transitions between M-MIMO configuration states.

27. The apparatus of claim 26,
wherein the output of the first input ML sub-model includes information regarding a radio link environment and the output of the second input ML sub-model includes information regarding a preceding configuration transition and one or more next states of the M-MIMO antenna.

28. The apparatus of claim 26,
wherein the set of second input data comprises a natural language processing based representation of the one or more transitions.

29. The apparatus of claim 25,
wherein the first input ML sub-model and the second input ML sub-model are configured to process the set of first input data and the set of second input data in parallel.

30. The apparatus of claim 25,
wherein the one or more predicted KPIs include at least one of:
a coverage parameter,
a load parameter,
a throughput parameter,
an interference parameter,
an inter-beam handoff parameter,
an inter-site handoff parameter, or
a combination thereof.

* * * * *